United States Patent [19]

Stephens et al.

[11] Patent Number: 5,013,980
[45] Date of Patent: May 7, 1991

[54] VOLTAGE REGULATOR IN A TELEVISION APPARATUS

[75] Inventors: Joseph C. Stephens; Enrique Rodriguez-Cavazos, both of Indianapolis, Ind.

[73] Assignee: Thomson Consumer Electronics, Inc., Indianapolis, Ind.

[21] Appl. No.: 265,846

[22] Filed: Nov. 1, 1988

[51] Int. Cl.⁵ .................... H01J 29/70; H04N 5/63
[52] U.S. Cl. .................................... 315/411; 358/190
[58] Field of Search ............... 315/411, 364; 358/190, 358/243

[56] References Cited

U.S. PATENT DOCUMENTS

| Re. 29,885 | 1/1979 | Dietz | 315/408 |
| 4,147,964 | 4/1979 | Luz et al. | 315/411 |
| 4,185,234 | 1/1980 | Baker | 315/411 |
| 4,392,090 | 6/1983 | Rinehart | 315/411 |
| 4,441,052 | 4/1984 | Willis | 315/8 |
| 4,631,652 | 12/1986 | Wendt | 363/16 |
| 4,651,214 | 3/1987 | Rodriguez-Cavazos | 358/190 |
| 4,672,642 | 6/1987 | Willis et al. | 377/20 |
| 4,680,511 | 7/1987 | Fitzgerald et al. | 315/411 |

FOREIGN PATENT DOCUMENTS 2651196 5/1978 Fed. Rep. of Germany .
0030278 2/1983 Japan .................................. 315/360

OTHER PUBLICATIONS

Service manual entitled "RCA Color Television Basic Service Data CTC 131 Series," published in 1984 by RCA Corporation, Consumer Electronics Division, cover sheet and p. 8.
Television service data manual for CTC 85 Chassis Series entitled "Chassis CTC 85 Series," dated 1977, published by RCA Corporation Consumer Electronics Technical Publications Department.

Primary Examiner—Thomas H. Tarcza
Assistant Examiner—Gregory C. Issing
Attorney, Agent, or Firm—Joseph S. Tripoli; Joseph J. Laks; Sammy S. Henig

[57] ABSTRACT

An input signal at a horizontal frequency is coupled to a deflection circuit through an isolation transformer during a power-on operation but not during a power-off operation. A voltage at a horizontal deflection frequency is developed in a linearity inductor of the deflection circuit. The voltage in the linearity inductor is rectified to produce a rectified signal that is coupled to an input terminal of a regulator oscillator of a power supply. The rectified signal is coupled to the regulator oscillator in an electrically nonisolated manner with respect to electrical shock hazard isolation and is electrically isolated by the transformer from the input signal. The regulator oscillator generates trigger pulses for controlling the switching operation of an SCR switch of the power supply to produce an output supply voltage that energizes the deflection circuit. The regulator oscillator is energized during both power-up and power-off operation and is responsive to the rectified signal to cause the duty cycle of an output signal of the oscillator to increase during power-off operation. The increased duty cycle causes the anode-to-cathode voltage of the SCR switch to be small enough to prevent latching of the SCR switch during the power-off operation. By preventing SCR switch latching, audible parasitic vibrations in the power supply are avoided.

36 Claims, 3 Drawing Sheets

VOLTAGE REGULATOR IN A TELEVISION APPARATUS

The invention relates to a switching regulator power supply of a television apparatus.

A typical deflection circuit output stage of a television receiver includes a retrace resonant circuit, including a deflection winding and a linearity inductance, and a transistor switch. The output stage generates, in a secondary winding of a flyback transformer, a retrace pulse that is rectified for generating a power-up or run supply voltage for energizing the receiver circuitry. The output stage is energized by a B+ supply voltage that is coupled to a terminal of a primary winding of the flyback transformer. The B+ supply voltage is produced and regulated in a switching regulator. The switching regulator includes a switch such as, for example, an SCR switch having an input terminal that is coupled to an unregulated supply voltage.

During normal power-up operation, the SCR switch is conductive from an instant that is controllable, occurring within each trace interval of a horizontal deflection cycle, and remains latched in a conductive state during the remaining part of trace. During retrace, the SCR switch is turned off in preparation for the following regulation cycle.

Regulated B+ supply voltage is developed in a filter capacitor that is coupled via a filter inductance to an output terminal of the SCR switch. The filter capacitor supplies a load current that flows in the deflection circuit output stage during power-up operation. A control circuit of the regulator that includes an oscillator provides, in a given cycle of a first control signal, a trigger pulse that varies the instant when the SCR switch becomes conductive. The trigger pulse occurs at an instant that is controlled in accordance with the B+ supply voltage in a negative feedback manner such that the B+ supply voltage is maintained regulated.

A turn-off winding of the flyback transformer, coupled between the unregulated supply voltage and the anode of the SCR, couples a retrace pulse to the anode of the SCR switch during each horizontal retrace interval to turn off the SCR switch during retrace. Thus, the oscillator of the control circuit is synchronized during the power-up operation by the retrace pulse. During a power-off operation the oscillator free runs. During the power-up operation, the timing of the trigger pulse that is produced by the oscillator varies in accordance with the B+ supply voltage in a negative feedback manner.

In a power supply, embodying a feature of the invention, the control circuit is energized during both the power-up and power-off operations so as to obviate the need for switching off the unregulated supply voltage via an on/off power switch. On the other hand, a horizontal rate drive signal, provided to the deflection circuit output stage from a horizontal drive stage, ceases to occur during the power-off operation. Consequently, the generation of the deflection current and of the retrace pulses is prevented. The result is that the load current supplied from the filter capacitor is substantially reduced during the power-off operation.

As explained before, the trigger pulses occur at a free running frequency, during the power-off operation. Any trigger pulse that occurs when the anode-to-cathode voltage of the SCR is insufficiently large to enable latching operation in the SCR switch, will, nevertheless, cause the SCR switch to be turned on in an unlatched mode of operation for an interval that is proportional to the pulse width of the trigger pulse. Assuming a constant width of the trigger pulse, it follows that in the unlatched mode of operation of the SCR switch the average current through the SCR switch in each period of the trigger pulses is directly related to the free running frequency of the trigger pulses. This is so because the duty cycle of the SCR switch is directly related to the frequency of the trigger pulses.

Assume that, during the power-off operation, the frequency or the duty cycle of the trigger pulses is at such a low value that the average current in the SCR switch in each period of the trigger pulses is smaller than the load current. Further assume that the load current is supplied entirely through the SCR switch. Therefore, the filter capacitor will discharge in each period of the trigger pulses by the small load current until attaining a level that will produce a sufficiently large anode-to-cathode voltage difference in the SCR switch for enabling the latching operation. Thereafter, the SCR switch will be triggered by the next trigger pulse of the free running oscillator and the latching operation will occur in the SCR switch.

Because the load current is small, the discharge time for obtaining such sufficiently large anode-to-cathode voltage difference that enables the latching operation might be equal to, for example, 160 miliseconds. Because retrace pulses are not present, during power-off operation, such latching operation will continue until the filter capacitor is again charged to a voltage that is equal to or greater than the unregulated supply voltage, causing the SCR switch to turn off. After the end of each latching operation and until such interval of 160 miliseconds will have elapsed the anode-to-cathode voltage of the SCR switch is again too small to enable the next latching operation.

During the latching operation, a high amplitude, wide pulse of current flowing in the SCR switch and, for example, in the filter inductance might be produced that is repetitive at a corresponding frequency of approximately 6 Hz. Such wide current pulses might produce an objectionable sound during power-off operation. The objectionable sound might be produced due to possible parasitic mechanical vibrations as a result of the wide pulse current in, for example, the inductance of the filter. Therefore, it may be desirable to prevent the filter capacitor from being discharged to a level that enables the undesirable latching operation in the SCR switch to occur, during the power-off operation.

In accordance with an aspect of the invention, a second control signal having two states that are indicative of the power-off and power-up operations, respectively, in the television receiver is applied to the control circuit for controlling the free running frequency of the oscillator of the control circuit during the power-off operation. The second control signal causes the free running frequency to increase in order to increase the duty cycle of the trigger pulses and of the SCR switch that operates in the turned-on unlatched mode. The duty cycle is increased so as to be sufficiently large to enable replenishing, during each trigger pulse, of all the filter capacitor charge that was lost during the interval that elapsed from the end of the immediately preceding trigger pulse. Because all the lost charge is replenished during each period of the trigger pulses, the filter capacitor voltage will be substantially at the same level at the end of each trigger pulse. Such level is sufficiently high to maintain the anode-to-cathode voltage of the SCR switch sufficiently low for preventing the latching operation of the SCR switch throughout the power-off operation. The result is that, advantageously, the aforementioned objectionable sound is eliminated.

During power-up operation, the second control signal has no effect on the duty cycle of the SCR switch. On the other hand, during the power-off operation, the second control signal causes an increase in the duty cycle of the first control signal and, in turn, that of the SCR switch. Without the operation of the second control signal the duty cycle of the SCR switch might be lower than required to prevent the latching operation.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all are at the same potential. The signal lines of each external device are coupled to the corresponding signal terminals of the receiver. In such an arrangement, the common conductor of each device, such as of the television receiver, may be held "floating", or conductively isolated, relative to the corresponding AC mains supply source that energizes the device. When the common conductor is held floating, a user touching a terminal that is at the potential of the common conductor will not suffer an electrical shock.

Therefore, it may be desirable to isolate the common conductor, or ground, of, for example, the television receiver from the potentials of the terminals of the AC mains supply source that provide power to the television receiver Such isolation is typically achieved by a transformer. The isolated common conductor is sometimes referred to as "cold" ground conductor.

In the switching regulator of the power supply of the invention, the AC mains supply voltage is coupled directly to a bridge rectifier for producing an unregulated direct current (DC) input supply voltage that is, for example, referenced to a common conductor, referred to as "hot" ground, and that is conductively isolated from the cold ground conductor. As a result, the control circuit, the B+ supply voltage, the primary winding of the flyback transformer, the linearity inductance and the deflection winding are also referenced to the hot ground conductor. On the other hand, a portion of the driver stage, that controls the switching operation of the deflection circuit transistor switch is, for example, referenced to the cold ground conductor. Likewise, an on/off control signal that may be generated by a remote control receiver for controlling the on/off operation of the receiver may also be referenced to the cold ground conductor.

A driver transformer of the driver stage couples a switching, second control signal at the horizontal frequency from the portion of the driver stage, that is referenced to the cold ground conductor, to the deflection circuit transistor switch, that is referenced to the hot ground. The driver transformer provides the required isolation barrier between the hot ground and the cold ground conductors. The on/off control signal may be applied to the driver stage to enable the generation of the second control signal, during normal power-up operation, and to disable its generation during shutdown or power-off operation that disables the operation of the deflection circuit.

In accordance with another aspect of the invention, the first control signal, namely the control signal that causes the free-running frequency of the oscillator of the control circuit to be above the audio range during the power-off operation, is produced from a voltage developed in the linearity inductor of the deflection circuit output stage. The first control signal is produced by an arrangement forming a signal path between the linearity inductor and the control circuit, which signal path is referenced to hot ground. Because the signal path is referenced to hot ground, the need for an additional hot-cold isolation arrangement for applying the power-up and power-off control information of the on/off control signal to the control circuit is, advantageously, obviated.

A television apparatus embodying an aspect of the invention includes a source of an input signal at a frequency that is related to a deflection frequency. A deflection circuit output stage, including a deflection current linearity element that is responsive to the input signal, generates a first signal in the linearity element during a power-on operation but not during a power-off operation of the television deflection apparatus. A power-on/power-off control signal is produced from the first signal that exhibits a power-on state during the power-on operation and a power-off state during the power-off operation. A utilization circuit of the television apparatus is responsive to the power-on/power-off control signal that causes the utilization circuit to operate in a mode of operation that corresponds to the level of the control signal.

FIGS. 4a–4d illustrate free running operation of the oscillator of the control circuit of FIG. 2.

Figure 1:
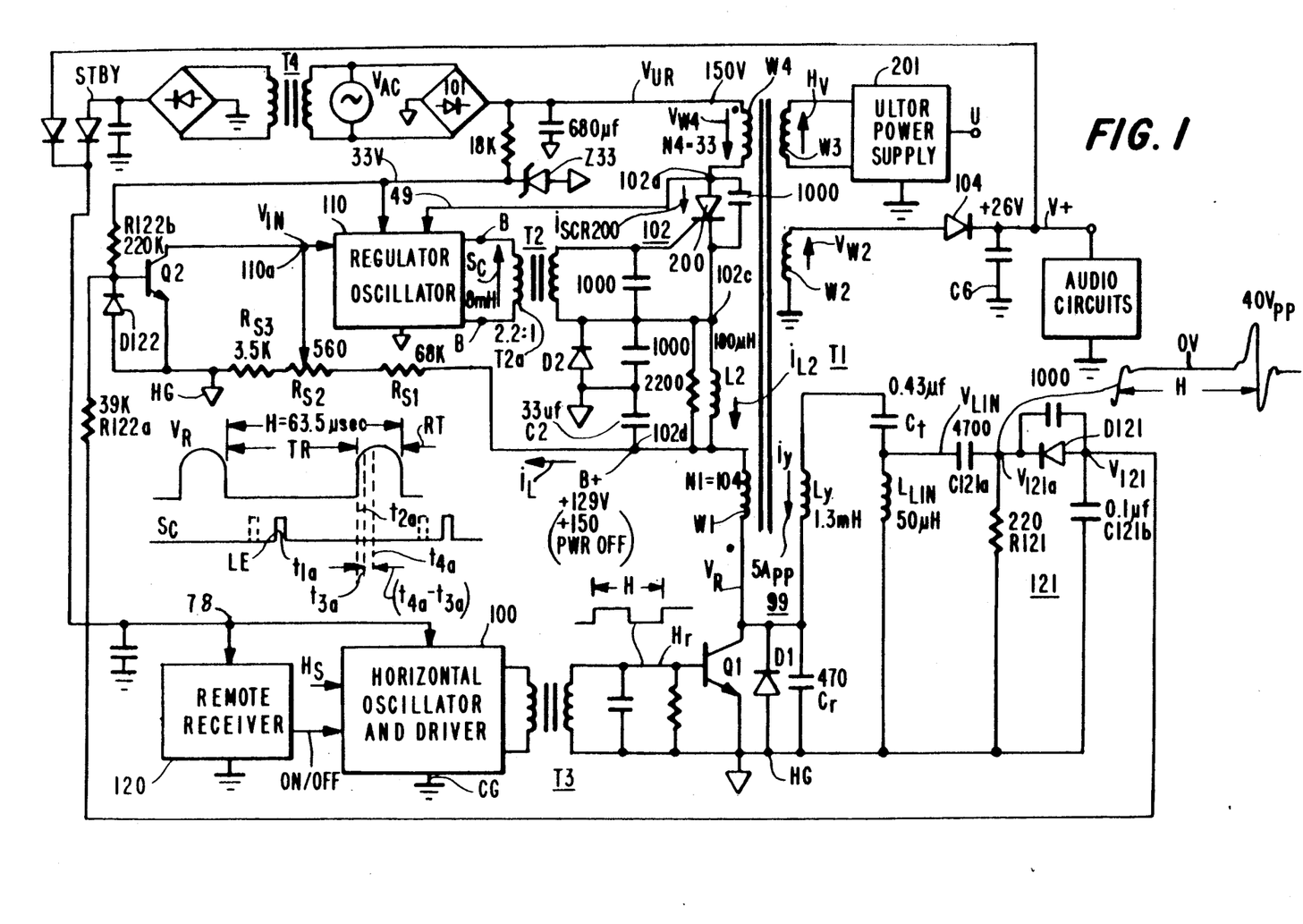
FIG. 1 illustrates a television power supply including a supply regulator embodying the invention.

FIG. 1 illustrates a portion of a television receiver incorporating a bridge rectifier 101 that rectifies a mains supply voltage $V_{AC}$ to produce a DC, unregulated voltage $V_{UR}$. An output stage, or switch regulator 102, that includes a silicon controlled rectifier (SCR) switch, referred to herein as SCR 200, produces a regulated voltage B+ that is coupled to a winding W1 of a flyback transformer T1. An input terminal 102a of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$, at the horizontal rate $f_H$, is developed at the base of transistor Q1, during a power-up operation. Signal $H_r$ is applied from a control circuit, referred to herein as a horizontal oscillator and driver 100 that is coupled to the base electrode of transistor Q1. Signal $H_r$ controls the switching of transistor Q1 for generating a deflection current $i_y$ in a series arrangement of a deflection winding $L_Y$, a trace capacitor $c_t$ and a linearity inductor $L_{LIN}$ of output stage 99. A retrace voltage $V_{w2}$ is produced in a conventional manner across a secondary winding W2 of transformer T1 in each retrace interval of each horizontal period H. Each retrace interval occurs immediately after transistor Q1 becomes nonconductive. A DC, run-mode supply voltage V+, that is, illustratively, +26 volts, is produced by rectifying voltage $V_{w2}$ in a rectifier arrangement 104 that is coupled to winding W2. Voltage V+ is coupled to various circuits of the receiver, not shown, to provide them with a run supply voltage, during power-up operation.

Voltage B+ is coupled via a voltage divider, including resistor $R_{s1}$, $R_{s2}$ and $R_{s3}$, to a control circuit 110 that is also referred to herein as regulator oscillator 110 that is energized during both power-up and power-off operations to provide a feedback voltage $V_{IN}$ at a terminal 110a. During power-up operation, control circuit 110 generates a signal $S_c$ at the horizontal rate $f_H$ and at a controllable phase that controls the instant, in each horizontal interval H, in which SCR 200 becomes conductive. The phase of signal $S_c$ varies in accordance with a difference between voltage $V_{IN}$, that is proportional to voltage B+, and a reference voltage, not shown in FIG. 1, that is produced in control circuit 110. The regulation provided by signal $S_c$ causes regulated voltage B+ to be at a predetermined DC voltage level such as, illustratively, +129 volts, during power-up operation.

The anode of SCR 200 is coupled to unregulated voltage $V_{UR}$ via a winding W4 of transformer T1. The cathode of SCR 200 is coupled to an end terminal 102c of a filter inductor L2. Terminal 102d, the other end terminal of inductor L2 where regulated voltage B+ is developed, is coupled to winding W1 of flyback transformer T1. A filter capacitor C2 is coupled to terminal 102d. Signal $S_c$ is coupled via a driver transformer T2 to the gate electrode of SCR 200.

When a leading edge LE of signal $S_c$ of FIG. 1, having a controllable phase as shown in the waveform of FIG. 1, occurs, SCR 200 is triggered and becomes immediately conductive. During normal power-up operation, leading edge LE occurs at a time $t_{1a}$ during a trace interval of each period H of a voltage $V_{W4}$ that is developed across winding W4. During the interval in which SCR 200 is conductive, a current $i_{L2}$ in inductor L2, that charge capacitor C2, increases. The rate of increase of current $i_{L2}$ is determined by unregulated voltage $V_{UR}$ and by regulated voltage B+.

At the end of horizontal trace, a time $t_{2a}$, shown in the waveform of FIG. 1, a retrace pulse portion of voltage $V_{W4}$ is developed. Voltage $V_{W4}$ is developed by a transformer action from voltage $V_R$ in retrace capacitor $C_r$. Retrace pulse $V_{W4}$ in winding W4 is poled in such a manner as to lend to reverse bias SCR 200 and to reduce the corresponding currents flowing in inductor L2. As a result of the negative rate of change of current $i_{L2}$ in inductor L2, a voltage developed at terminal 102c is decreased until a time $t_{3a}$ of retrace pulse portion RT when a catch diode D2 that is coupled to terminal 102c becomes conductive. The operation of a diode such as catch diode D2 is described in detail in U.S. Pat. No. 4,163,926, entitled SWITCH REGULATOR FOR A TELEVISION APPARATUS, in the name of D. H. Willis, that is incorporated by reference herein.

Figure 2:
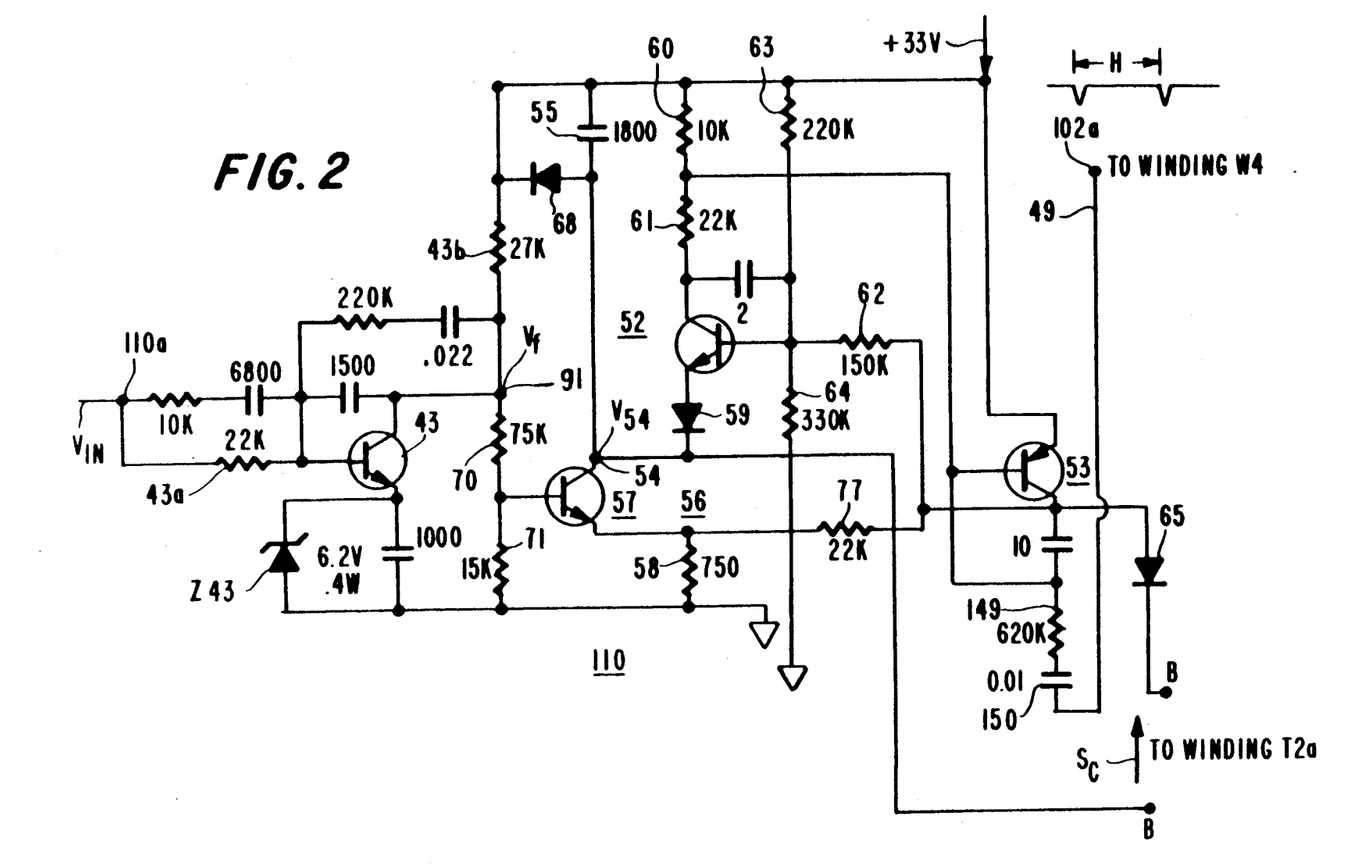
FIG. 2 illustrates the control circuit of the supply regulator of FIG. 1 that includes an oscillator.

FIG. 2 illustrates a detailed schematic diagram of regulator oscillator or SCR control circuit 110 of FIG. 1. Similar numerals and symbols in FIGS. 1 and 2 indicate similar items or functions. During normal power-up operation, control circuit or regulator oscillator 110 of FIG. 2 is synchronized by a retrace signal 49 developed at terminal 102a of SCR 200 of FIG. 1 from voltage $V_{W4}$. During shut-down or power-off operation, regulator oscillator 110 operates continuously as a free running oscillator and generates signal $S_c$, as described later on.

Both PNP transistor 53 of FIG. 2 and NPN transistor 52 switch states at a rate established by trip level voltages for a control terminal 54. Control terminal 54 is coupled to the emitter of transistor 52 through a diode 59. A charging capacitor 55 that is coupled to a regulated +33 volt source is charged through a controllable current source 56 comprising a transistor 57 and a resistor 58, coupled in series. The junction of the capacitor 55 and the collector of transistor 57 form control terminal 54 that was mentioned before. The +33 volt source is produced across a zener diode Z33 during both power-up and power-off operations.

Complementary transistors 52 and 53 are coupled together in a latching arrangement. That is, the collector output terminal of transistor 53 is coupled to the base input terminal of transistor 52, and the collector output terminal of transistor 52 is coupled to the base input terminal of transistor 53, both transistors thereby forming a regenerative latch.

Under continuous free-running oscillator conditions of regulator oscillator 110 that occur during power-off operation, as explained later on, when transistor 52 becomes conductive, current is drawn from the +33 volt source to the collector of transistor 52 through resistors 60 and 61, thereby turning on transistor 53. Part of the collector current of transistor 53 is then coupled to the base of transistor 52 through a resistor 62, thereby regeneratively turning on both transistors into saturated conduction. Similarly, when transistor 52 becomes nonconductive, both transistors regeneratively turn off.

Operation of regulator oscillator 110 for one free-running cycle will now be described. Consider an interval during which transistors 52 and 53 are nonconducting. The voltage at the base of the resistor transistor 52 is determined by the resistance values of a voltage divider comprising resistor 63 in series with the parallel combination of resistors 64 and 62. This base voltage establishes a two-diode drop less a lower level trip voltage $V_L$ for control terminal 54. Should voltage $V_{54}$ at terminal 54 decrease below level $V_L$, transistors 52 and 53 would regeneratively turn on.

When both transistors 52 and 53 are conductive, the voltage divider ratio changes. With transistor 53 in saturated conduction, resistor 63, rather than resistor 64, is now effectively paralleled by resistor 62, developing a new, more positive base voltage for transistor 52 and establishing a two-diode drop less upper level trip voltage $V_H$ for control terminal 54. Should voltage $V_{54}$ at terminal 54 increase above level $V_H$, transistors 52 and 53 would regeneratively turn off.

Figures 4A, 4B:
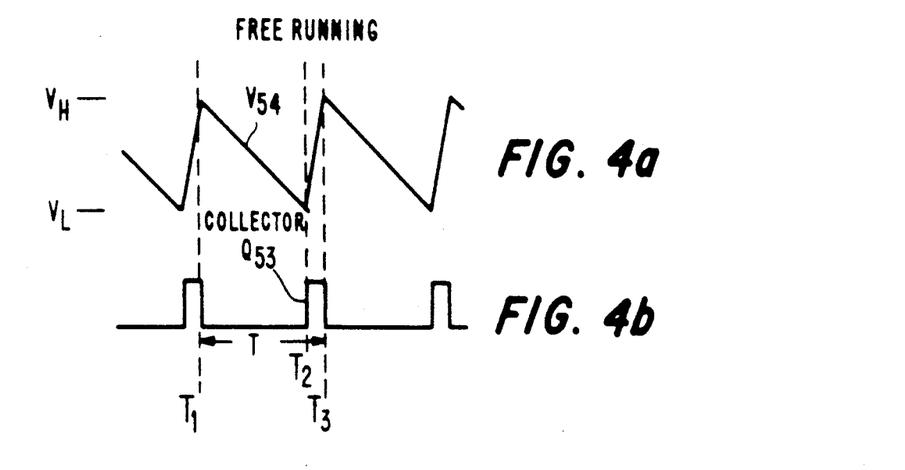

FIGS. 4a and 4b illustrate idealized waveforms for voltage $V_{54}$ at control terminal 54 and the collector voltage of oscillator transistor 53 during continuous free-running operation of regulator oscillator 110 that occurs during power-off operation of the power supply. During power-off operation, regulator oscillator 110 of FIG. 1 is energized but deflection circuit output stage 99 is disabled. Consider voltage $V_{54}$ of FIG. 2 during the interval, beginning somewhat after time $T_1$. Transistors 52 and 53 are turned off, and capacitor 55 is charging from the +33 volt source at a constant rate determined by the base voltage of transistor 57 of controllable current source 56 The voltage at terminal 54 is thus a decreasing sawtooth. At time $T_2$, voltage $V_{54}$ has decreased to its lower trip voltage level $V_L$. Subsequently, transistors 52 and 53 regeneratively turn on.

The collector of transistor 53 is coupled to one of output terminals B—B through a diode 65. A primary winding T2a of transformer T2 of FIG. 1 is coupled between terminals B—B. A discharge path of capacitor 55 comprises the terminal of capacitor 55 coupled to the +33 volt source, the emitter-collector path of transistor 53, diode 65, winding T2a coupled across terminals B—B and the other terminal of capacitor 55. To prevent current source 56 from undesirably charging capacitor 55 during the capacitor discharging interval, the collector of transistor 53 is coupled to the emitter of transistor 57 through a resistor 77. When transistor 53 conducts, transistor 57 is cut off, disabling current source 56 during the discharge interval.

As illustrated in FIG. 4a, beginning at time $T_2$, voltage $V_{54}$ at terminal 54 comprises an increasing sawtooth. At time $T_3$, voltage $V_{54}$ has increased to its upper trip voltage level $V_H$. Transistors 52 and 53 regeneratively turn-off, and the next charging cycle begins.

As represented by the collector voltage of transistor 53, illustrated in FIG. 4b, during the approximate interval $T_2$-$T_3$, an output signal is coupled to regulator oscillator 110 output terminals B—B to provide gating current to turn-on the regulator SCR 200 of FIG. 1. The actual time width of interval $T_2$-$T_3$ of FIGS. 4a-4b is relatively unimportant provided sufficient SCR gating current of a sufficient duration is coupled to SRC 200 of FIG. 1 to turn it on.

In normal power-up operation, regulator oscillator 110 is not left continuously free-running as in power-off operation but is synchronized with horizontal deflection. The charging rate of capacitor 55 of FIG. 2 is varied depending upon the magnitude of the feedback voltage $V_f$ coupled to a feedback terminal 101 for varying the turn-on instant and conduction angle of SCR 200 of FIG. 1.

FIGS. 3a-3d illustrate waveforms useful for explaining normal power-up operation of control circuit 110 of FIGS. 1 and 2. Similar numerals and symbols in FIGS. 1, 2 and 3a-3d indicate similar items or functions.

Figures 3A, 3B:
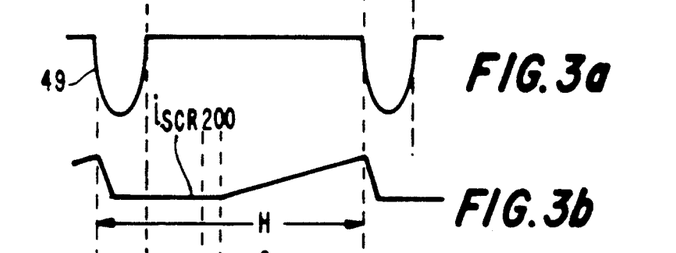
FIGS. 3a–3d illustrate waveforms useful in explaining the normal power-up operation of the circuits of FIG. 1 and 2.

At the beginning of the retrace interval at time $t_1$ of FIGS. 3a, negative going retrace pulse 49 of FIG. 2 is coupled from terminal 102a to the base electrode of transistor 53 through a resistor 149 and a capacitor 150 that causes transistor 53 to become conductive. Therefore, capacitor 55 becomes immediately afterward substantially discharged.

After time $t_2$, the beginning of trace, capacitor 55 begins to charge at a rate determined by the voltage at the base of transistor 57 of current source 56. Voltage $V_{54}$ decreases until lower trip voltage $V_L$ is reached at time $t_4$. At time $t_4$, the oscillator transistors regeneratively turn on, resulting in a gating signal $S_{c(2)}$ being generated and coupled to SCR 200 to turn on the SCR, as illustrated in FIG. 3c.

Figures 3C, 3D:
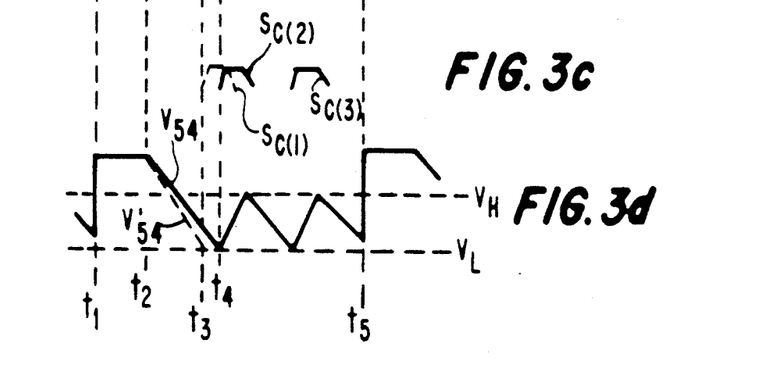

Regulator oscillator 110 then continues in a free-running mode and, as illustrated in FIG. 3d, several charge-discharge cycles may occur before another synchronizing retrace pulse 49 is coupled to terminal 102a at time $t_5$. In this way, the free-running mode, unlike in the power-off operation, is interrupted by synchronizing retrace pulse 49. Thus, as illustrated in FIG. 3c, in the subsequent free-running mode after time $t_4$, and prior to the next retrace pulse 49, another SCR 200 gating signal $S_c$ may be coupled to the SCR. The number of additional gating signals will depend upon such factors as the position of the turn-on instant $t_4$ within the horizontal trace interval and the charging and discharging rates established for capacitor 55. Such additional turn-on gating signals are of relatively little consequence, since the SCR remains in a conductive state as long as the current through the SCR is above its holding current level.

To provide regulation, the turn-on instant $t_4$ is varied within the trace interval by varying the charge rate of capacitor 55 through a varying voltage at the base of transistor 57. Transistor 57 base voltage is the proportioned value of feedback voltage $V_f$ coupled to the base of transistor 57 through a voltage divider comprising resistors 70 and 71.

An error amplifying transistor 43 has a base electrode that is coupled to feedback signal $V_{IN}$ that is representative of voltage B+ via an input resistor 43a. Collector load resistors 43b, 70 and 71 form a load resistance at the collector of transistor 43. A zener diode Z43 that is coupled to the emitter of transistor 43 determines the threshold voltage of the inverting amplifier that includes transistor 43. Amplified error voltage $V_f$ that is developed at a terminal 91, at the collector of transistor 43, is coupled to the base electrode of transistor 57.

After time $t_2$, the beginning of trace, capacitor 55 begins to charge at a rate determined by the voltage at the base of transistor 57 of current source 56. The voltage $V_{54}$ decreases until the lower trip voltage $V_L$ is reached at time $t_4$. At time $t_4$, the oscillator transistors regeneratively turn on, resulting in gating signal $S_{c(2)}$ being coupled to SCR 200 to turn the SCR on, as illustrated in FIG. 3c.

Should the regulated B+ voltage at terminal 102d of FIG. 1 decrease, for example, the inverted feedback voltage $V_f$ of FIG. 2 increases causing the base voltage of transistor 57 to also increase. The current magnitude of current source 56 increases, increasing the charge rate of capacitor 55. As illustrated in FIGS. 3d and 3c by the dotted waveforms $V_{54}$ and $S_{c(1)}$, the lower trip voltage level $V_L$ is reached at an earlier instant $t_3$, generating a gating pulse $S_{c(1)}$ at the earlier instant $t_3$, as required for proper regulation.

A user initiated command to enable shut-down or power-off operation of the television receiver causes remote receiver 120 of FIG. 1 to generate an on/off control signal ON/OFF at an "OFF" state that is applied to driver 100. After power-off command occurs, the operation of signal on/off causes switching signal $H_r$ at the base electrode of transistor Q1 to be removed. Therefore, output stage 99 is disabled and supply voltage V+ is not generated. Also, retrace pulse $V_{W4}$ in winding W4 of transformer T1 is not generated. Consequently, retrace pulse 49 that, in normal power-up operation, synchronizes regulator oscillator 110 is not generated during the power-off operation that follows. Because regulator oscillator 110 is energized from voltage $V_{UR}$ also during the power-off operation, regulator oscillator 110 free runs continuously, as described before.

Assume that, in a given interval that occurs during the power-off operation, the magnitude of the anode-to-cathode voltage of SCR 200 is smaller that the minimum required for enabling latching operation in SCR 200. In this case, any trigger pulse of free running control signal $S_c$ that occurs when the anode-to-cathode voltage of SCR 200 is insufficiently large to enable latching operation in SCR 200, will, nevertheless, cause SCR 200 to turn on in an unlatched mode. In each such period of signal $S_c$, SCR 200 will be turned on for an interval that is proportional to the pulse width of the trigger pulse or, for example, to interval $T_2$–$T_3$ of FIG. 4b. The pulse width of each trigger pulse is constant. It follows that for a given anode-to-cathode voltage difference in SCR 200 of FIG. 1 operating in the turned-on unlatched operation, the average value of current $i_{SCR200}$ through SCR 200 in each period T of FIG. 4b of the trigger pulses of signal $S_c$ of FIG. 1 is directly related to the frequency of the trigger pulses. This is so because the duty cycle of SCR 200 is directly related to the frequency of the trigger pulses.

Further assume that, in the aforementioned given interval during the power-off operation, the free running frequency of the trigger pulses is so low that the average value of current $i_{SCR200}$ in SCR 200 in each period of the trigger pulses is smaller than a load current $i_L$ in resister $R_{S1}$. Additionally, assume that the load current $i_L$ is supplied entirely through SCR 200. Therefore, filter capacitor C2 would discharge by load current $i_L$ until attaining a voltage level that produces a sufficiently large anode-to-cathode voltage difference in SCR 200, such as 10 volts, for enabling the latching operation. Thereafter, SCR 200 will be triggered by the next trigger pulse produced by free running oscillator 110 and the latching operation will occur in SCR 200.

Because load current $i_L$ is small, the discharge interval for obtaining such sufficiently large anode-to-cathode voltage difference that enables the latching operation in SRC 200 may be equal to, for example, 160 milliseconds. Since retrace pulses $V_{W4}$ are not present, during the power-off operation, such latching operation will continue until filter capacitor C2 is again charged to a voltage that is equal to or greater from unregulated supply voltage $V_{UR}$, causing the SCR 200 to turn off. At the end of each such latching operation, the anode-to-cathode voltage of SCR 200 is again insufficiently large to permit the next latching operation until the next interval of 160 milliseconds has elapsed.

The latching operation might produce a high amplitude, wide pulse of current $i_{SCR200}$ flowing in SCR 200 and in filter inductor L2 that is repetitive at a corresponding frequency of approximately 6 Hz. Such wide current pulses might produce an objectionable sound during power-off operation. The objectionable sound might be produced due to possible parasitic mechanical vibrations as a result of the wide pulses current in, for example, inductor L2. Such sound may be objectionable if it occurs during the power-off operation when the user does not expect any sound to come from the turned-off television receiver. Therefore, it may be desirable to prevent filter capacitor C2 from being discharged to a level that enables the undesirable latching operation in the SCR 200, during the power-off operation.

In accordance with an aspect of the invention, a signal $V_{121}$ that is derived from a voltage $V_{LIN}$ developed in linearity inductance $L_{LIN}$ of FIG. 1 is applied to a transistor Q2 operating as a switch that is coupled to terminal 110a of regulator oscillator 110. Transistor Q2 causes voltage $V_{IN}$ to be zero for increasing the frequency of signal $S_c$, during the power-off operation, to the maximum value, in a manner that is described later on.

Signal $V_{121}$ causes The free running frequency of signal $S_c$ to increase in order to increase the duty cycle of the trigger pulses. The duty cycle is increased so as to become sufficiently large to enable replenishing, during each trigger pulse, of all the charge in filter capacitor C2 that was lost during the interval that elapsed from the immediately preceding trigger pulse of signal $S_c$. Because all the charge lost is replenished during each period of the trigger pulses, voltage B+ in filter capacitor C2 will be maintained substantially at the same level at the end of each trigger pulse. Such level of voltage B+ is sufficiently high to maintain the anode-to-cathode voltage of SCR 200 sufficiently low for preventing the latching operation of the SCR switch from ever occurring throughout the power-off operation. The result is that, advantageously, the aforementioned objectionable sound is eliminated, as explained in detail in U.S. Pat. No. 4,866,525, entitled A Television Apparatus Power Supply in the names of Rodrigez-Cavazos et al., incorporated by reference herein.

During power-up operation, signal $V_{121}$ has no effect on the duty cycle of the SCR 200. On the other hand, during the power-off operation, signal $V_{121}$ causes an increase in the duty cycle of signal $S_c$ and, in turn, that of SCR 200. Without the operation of signal $V_{121}$ the duty cycle of the SCR 200 is insufficient to prevent the latching operation. The way signal $V_{121}$ is produced and utilized is further explained below.

During normal power-up operation, AC voltage $V_{LIN}$ at the frequency $f_H$ is developed in linearity inductor $L_{LIN}$. A capacitor C121a and a resistor R121 form a series arrangement that is coupled in parallel with inductor $L_{LIN}$ and that dampens ringings in inductor $L_{LIN}$. During a portion of retrace, capacitor C121a is charged by a positive going retrace pulse of voltage $V_{LIN}$. At the end of such retrace pulse portion, as the retrace pulse of voltage $V_{LIN}$ becomes smaller, capacitor C121a, that is already charged, produces a negative pulse voltage of a bipolar signal $V_{121a}$ at a cathode of a diode D121 that is coupled between resistor R121 and capacitor C121a. Diode D121 and a filter capacitor C121b form a negative peak detector 121 that produces signal $V_{121}$. The loading effect of detector 121 on inductor $L_{LIN}$, is, advantageously, substantially insignificant. Therefore, detector 121 substantially does not affect deflection current. Signal $V_{121}$ that is negative during power-up operation is produced at the anode of diode D121 and is coupled through a resistor R122a to the base of transistor Q2. A protection diode D122 coupled between the base and the emitter electrodes of transistor Q2 prevents the base-emitter reverse voltage in transistor Q2 from exceeding the forward voltage of diode D122.

In accordance with a feature of the invention, negative signal $V_{121}$ causes transistor Q2 to be nonconductive throughout normal power-up operation. On the other hand, throughout power-off operation, negative signal $V_{121}$ is not generated and a resistor R122b that is coupled between the +33 volt supply and the base of transistor Q2 causes transistor Q2 to be conductive. Transistor Q2 of FIG. 1 operates as a conductive switch throughout the power-off operation and as a nonconductive switch throughout the normal power-up operation. The collector of transistor Q2 is coupled to input terminal 110a of control circuit 110 where voltage $V_{IN}$ is developed and causes voltage $V_{IN}$ to be zero during power-off operation. Therefore, the rate of change of voltage $V_{54}$ of FIG. 2 becomes substantially higher than if voltage B+ were permitted to control the level of voltage $V_{IN}$ during the power-off operation. The result is that control circuit 110 will produce signal $S_c$ of FIG.

1 at a free-running frequency that is at the maximum. Therefore, as explained before, the aforementioned objectionable sound is eliminated. Had voltage B+ been permitted to control the level of voltage $V_{IN}$ during the power-off operation, the frequency of signal $S_c$ might have been at a minimum during at least a portion of each of the aforementioned 160 millisecond intervals.

Regulator oscillator 110, transistor Q2, linearity inductance $L_{LIN}$, switch regulator 102 and linearity inductor $L_{LIN}$ are, each, referenced to a common ground conductor HG that is conductively coupled to mains supply voltage $V_{AC}$ and that is referred to herein as hot ground conductor HG. On the other hand, each of remote receiver 120 and horizontal oscillator and driver 100 of the television receiver is referenced to a common ground conductor CG that is conductively isolated from hot ground conductor HG and that is referred to herein as cold ground conductor CG. The conductive isolation between the hot and the cold ground conductors is accomplished, in part, by energizing remote receiver 120 and driver 100 from a voltage 78 produced in a conventional manner that is conductively isolated from hot ground conductor HG. Voltage 78 is produced during both the power-off and the power-up operations.

In accordance with another aspect of the invention, signal $V_{121}$ that is applied to regulator oscillator 110 and to regulator switch 102 through transistor Q2 is generated from voltage $V_{LIN}$ developed across inductor $L_{LIN}$ via a signal path that is referenced to hot ground conductor HG. The signal path includes capacitor C121a and detector 121 that are, each conductively coupled to hot ground conductor HG. Signal $V_{121}$ that is referenced to hot ground conductor HG has two levels that correspond to the "OFF" state and to an "ON" state, respectively, of on/off control signal ON/OFF that is referenced to cold ground conductor CG. The "power-up" state of signal $V_{121}$ is obtained from horizontal rate signal $H_r$ that is generated only during the power-up operation. Signal $H_r$ is a transformer coupled signal that is coupled across the hot-cold barrier formed by transformer T3. In this way, advantageously, on/off control signal ON/OFF is applied to transistor Q2 via transformer T3 that maintains the hot-cold barrier. Transformer T3 is the same transformer used for supplying signal $H_r$ to deflection switch transistor Q1, as described before. Consequently, the need for an additional circuit element for applying the two states of on/off control signal ON/OFF across such hot-cold barrier is obviated. Advantageously, extracting the on/off information from voltage $V_{LIN}$ is accomplished without adversely affecting deflection current $i_y$.

What is claimed is:

1. A television apparatus, comprising:
   a source of an input signal at a frequency that is related to a deflection frequency;
   a deflection circuit output stage, including a deflection current linearity element, responsive to said input signal for generating an alternating current first signal in said linearity element with an alternating current magnitude during a power-on operation but not during a power-off operation of said television deflection apparatus;
   means coupled to said linearity element and responsive to said first signal for producing in accordance with said alternating current magnitude thereof a power-on/power-off control signal that exhibits a power-on state during said power-on and a utilization circuit of said television apparatus responsive to said power-on/power-off control signal that causes said utilization circuit to operate in a mode of operation that corresponds to said level of said control signal.

2. An apparatus according to claim 1 wherein said control signal producing means comprises a peak detector, said deflection circuit output stage comprises a horizontal deflection output stage and said linearity element comprises a linearity inductance.

3. An apparatus according to claim 2 wherein said control signal producing means further comprises an R-C network that includes a snubber resistor that is interposed between said detector and said linearity inductance.

4. An apparatus according to claim 1 wherein said source of said input signal comprises a remote receiver and a drive stage responsive to a second power-on/power-off control signal that is generated by said remote receiver for producing said input signal in said drive stage when said second power-on/power-off control signal is at a power-on state but not when said second power-on/power-off control signal is at a power-off state.

5. An apparatus according to claim 4 further comprising coupling means for coupling said drive stage to said deflection circuit output stage such that said drive stage is electrically isolated from said output stage with respect to electrical shock hazard isolation.

6. A television apparatus for generating a power-up/power-off control signal, comprising:
   first means for generating a first signal at a frequency that is related to a deflection frequency during a power-up operation of said television apparatus but not during a power-off operation thereof;
   coupling means having a first portion that is electrically nonisolated from sd first signal with respect to electrical shock hazard isolation and a second portion that is electrically isolated from said first signal with respect to electrical shock hazard isolation for coupling said first signal to said second portion to develop in said second portion a second signal that is electrically isolated from said first signal such that said second signal is generated during said power-up operation but not during said power-off operation;
   a deflection switch coupled to and electrically nonisolated from said second portion of said coupling means and being switched in response to said second signal during said power-up operation but not during said power-off operation for generating a deflection current in a deflection winding during said power-up operation;
   third means responsive to said second signal and electrically nonisolated from said second portion of said coupling means for generating said power-up/power-off control signal that is electrically isolated from said first signal and that is in a power-up state as long as said second signal is being generated during said power-up operation and that is in a power-off state as long as said second signal is not being generated during said power-off operation; and
   an oscillator electrically isolated from said first signal for being energized during both power-up and power-off operations to generate an oscillator signal during both operations, said oscillator being responsive to and electrically nonisolated from said control signal and being placed in a power-up mode of operation when said control signal is in said power-up state and being placed in a power-off mode of operation when said control signal is in said power-off state.

7. A television apparatus according to claim 6 wherein said oscillator comprises a power supply regulator oscillator.

8. A television apparatus according to claim 7 wherein said regulator oscillator is electrically nonisolated from an input AC main supply voltage.

9. A television apparatus according to claim 6 wherein said coupling means comprises an isolation transformer.

10. A television apparatus according to claim 6 further comprising a linearity inductance wherein said third means is responsive to a signal that is developed in said linearity inductance for generating a first level of said power-on/power-off control signal when the switching in said deflection switch occurs and a second level when the switching operation in said deflection switch is disabled.

11. A television apparatus according to claim 10 wherein said third means comprises a peak detector.

12. A television apparatus according to claim 11 further comprising an R-C network coupled between said linearity inductance and said detector for generating a bipolar signal that is coupled to an input terminal of said detector.

13. A television apparatus according to claim 12 wherein said R-C network also dampens current ringing in said linearity inductance.

14. A television apparatus according to claim 6 further comprising, a regulator switch for coupling an input supply voltage to a load, during a portion of a given periodic interval that is determined in accordance with said first signal to generate an output supply voltage at a level that varies in accordance with said oscillator signal, wherein said oscillator comprises a regulator oscillator that is energized during both said power-up operation and during said power-off operation for generating said oscillator signal during both said power-up and said power-off operations such that during said power-up operation said oscillator signal varies in accordance with a feedback signal that is representative of said output supply voltage that, in turn, causes a duty cycle of said regulator switch to vary in a negative feedback loop manner for regulating said output supply voltage, wherein said power-up/power-off control signal is coupled in said feedback loop for controlling the frequency of said oscillator signal during said power-off operation in a manner that does not affect the frequency of said first signal during said power-up operation.

15. A television apparatus according to claim 14 wherein said regulator oscillator is synchronized to said first signal during said power-up operation and free runs during said power-off operation.

16. A television apparatus according to claim 14 wherein said load comprises a deflection circuit output stage that is coupled to receive said output supply voltage and that is energized thereby.

17. A television apparatus according to claim 14 wherein said first signal is at a horizontal rate during said power-up operation.

18. A television apparatus according to claim 14 wherein said coupling means forms a hot-cold barrier isolation that electrically isolates said first signal from said deflection switch, wherein said third means and said regulator oscillator form a signal path that is interposed between said regulator switch and said deflection switch, said signal path being electrically isolated from said first signal and electrically nonisolated from said second portion of said coupling means.

19. A television apparatus according to claim 6 further comprising a remote receiver and a driver stage responsive to a second power-on/power-off control signal that is generated by said remote receiver for producing said first signal when said second power-on/power-off control signal is at said power-on state but not at said power-off state.

20. A switch mode power supply of a television apparatus, comprising:
a source of an input supply voltage;
a filter capacitor for developing therein an output supply voltage;
a load coupled to said filter capacitor for producing a load current from a charge that is stored in said filter capacitor;
means for generating a periodic switching first control signal during both power-on and power-off modes of operation of said power supply;
a regulator switch having said periodic switching first control signal coupled to a control terminal thereof and having a main current conducting input terminal coupled to said input supply voltage and a main current conducting output terminal coupled to said filter capacitor for producing a switching current in said regulator switch during both power-on and power-off modes of operation that is coupled to said filter capacitor to develop from said switching current an output supply voltage in said filter capacitor, said regulator switch being capable of operating in a periodic latched conductive state when said first control signal is developed, provided that a first voltage, developed at said regulator switch output terminal and coupled from said filter capacitor, is at a level that is within a first range of values; and
means for generating, a power-on/power-off control signal that is coupled to a control terminal of said first control signal generating means for changing said first control signal during said power-off mode of operation, to produce said switching current in said regulator switch during said power-off mode of operation at a level that causes said first voltage to be outside said range of values in order to prevent said regulator switch from operating in a latched conductive state throughout said power-off operation.

21. A power supply according to claim 20 further comprising, a second switch responsive to said power-on/power-off control signal and coupled in a feedback signal path that is formed between said output supply voltage and said control terminal of said first control signal generating means for decoupling a feedback signal that is representative of said output supply voltage from said control terminal of said first control signal generating means throughout said power-off mode of operation to increase a duty cycle of said first control signal that, in turn, increases a duty cycle of said regulator switch, wherein during said power-on mode of operation, said feedback signal causes said first control signal generating means to vary timings of said first control signal in accordance with said output supply voltage that, in turn, varies said duty cycle of said regulator switch for regulating said output supply voltage.

22. A power supply according to claim 21 further comprising, means for generating an input signal at a frequency that is related to a deflection frequency, during said power-up mode of operation, and a deflection circuit output stage having a deflection switch that is responsive to said synchronizing input signal and that switches at a corresponding frequency, for producing in said output stage a second control signal at a corresponding frequency during said power-up mode of operation that is coupled to one of said input and output terminals of said regulator switch to turn off said regulator switch in a synchronized manner such that during said power-off operation said second control signal is disabled.

23. A power supply according to claim 22 wherein said deflection circuit output stage further comprises a linearity inductance and wherein a third signal that is developed in said linearity inductance and that is indicative of the absence of any switching operation in said deflection switch is coupled to said control terminal of said first control signal generating means for controlling said duty cycle of said first control signal.

24. A power supply according to claim 23 wherein said third signal is coupled to an input terminal of an R-C network having an output terminal that is coupled to an input terminal of a peak detector for generating a bipolar fourth signal at said input terminal of said detector and wherein said peak detector is capable of producing said power-on/power-off control signal at a required polarity.

25. A power supply according to claim 24 wherein said R-C network also dampens current ringing in said linearity inductance.

26. A power supply according to claim 22 wherein said load comprises a primary winding of a flyback transformer that is included in said deflection circuit output stage, said primary winding being coupled to said output supply voltage and energized thereby during said power-up mode of operation and draws substantially no load current during said power-off mode of operation when no switching operations occurs in said deflection switch.

27. A power supply according to claim 22 wherein said synchronizing input signal is at a horizontal rate during said power-up operation and wherein said second control signal is developed in a flyback transformer winding of said output stage.

28. A power supply according to claim 22 wherein said first control signal generating means comprises a regulator oscillator that is synchronized to said synchronizing input signal during said power-up operation and free runs during said power-off operation.

29. A power supply according to claim 28 further comprising, coupling means having a first portion that is electrically isolated from said regulator oscillator and from said deflection switch with respect to electrical shock hazard and electrically nonisolated from said synchronizing input signal with respect to electrical shock hazard and having a second portion that is electrically nonisolated from said deflection switch and from said regulator oscillator for coupling said synchronizing input signal to a control terminal of said deflection switch through a hot-cold barrier isolation that electrically isolates said synchronizing input signal from said deflection switch and that electrically isolates said regulator oscillator from said synchronizing input signal.

30. A power supply according to claim 29 wherein said deflection switch, said second portion of said coupling means and said regulator oscillator are electrically nonisolated from said input supply voltage and electrically isolated from said synchronizing input signal.

31. A power supply according to claim 21 wherein said power-on/power-off control signal that is coupled to said control terminal of said first control signal generating means causes an increase in a frequency of said first control signal throughout said power-off operation.

32. A power supply according to claim 20 wherein, said regulator switch comprises a silicon controlled rectifier (SCR), and wherein said second control signal is coupled to a transformer turn-off winding that is, in turn, coupled in series with said SCR.

33. A television apparatus, comprising:
a source of an input signal at a frequency that is related to a deflection frequency;
a horizontal deflection circuit output stage, including a linearity inductance, responsive to said input signal for generating a first signal in said linearity element during a power-on operation but not during a power-off operation of said television deflection apparatus;
a peak detector coupled to said linearity inductance and responsive to said first signal for producing a power-on/power-off control signal that exhibits a power-on stage during said power-on operation and a power-off state during said power-off operation; and
a utilization circuit of said television apparatus responsive to said power-on/power-off control signal that causes said utilization circuit to operate in a mode of operation that corresponds to said level of said control signal.

34. An apparatus according to claim 33 wherein said peak detector further comprises an R-C network that includes a snubber resistor that is interposed between said detector and said linearity inductance.

35. A television apparatus, comprising:
a remote receiver;
a source of a first power-on/power-off control signal;
a drive stage responsive to said control signal for producing an input signal in said drive stage at a frequency that is related to a deflection frequency when said first power-on/power-off control signal is at a power-on state but not when said first power-on/power-off control signal is at a power-off state;
a deflection circuit output stage, including a deflection current linearity element, responsive to said input signal for generating a first signal in said linearity element during a power-on operation but not during a power-off operation of said television deflection apparatus;
means coupled to said linearity element and responsive to said first signal for producing a second power-on/power-off control signal that exhibits a power-on state during said power-on operation and a power-off state during said power-off operation; and
a utilization circuit of said television apparatus responsive to said second power-on/power-off control signal that causes said utilization circuit to operate in a mode of operation that corresponds to said level of said second power-on/power-off control signal.

36. An apparatus according to claim 35 further comprising coupling means for coupling said drive stage to said deflection circuit output stage such that said drive stage is electrically isolated from said output stage with respect to electrical shock hazard isolation.

* * * * *

UNITED STATES PATENT AND TRADEMARK OFFICE
CERTIFICATE OF CORRECTION

PATENT NO. : 5,013,980

DATED : May 7, 1991

INVENTOR(S) : JOSEPH CURTIS STEPHENS ET AL.

It is certified that error appears in the above-identified patent and that said Letters Patent is hereby corrected as shown below:

Col. 11, line 68, before "and" insert --operation--; and
after "and" insert -- a power-off state during said power-off operation; and --.

Col. 12, line 37, "sd" should be -- said --.

Signed and Sealed this

Seventeenth Day of November, 1992

*Attest:*

DOUGLAS B. COMER

*Attesting Officer*     *Acting Commissioner of Patents and Trademarks*